J. W. SKELTON.
FLYTRAP.
APPLICATION FILED AUG. 6, 1919.

1,328,850.

Patented Jan. 27, 1920.

Inventor
J. W. Skelton
by Lacey & Lacey,
his Atty's.

UNITED STATES PATENT OFFICE.

JOHN W. SKELTON, OF DOUGLAS, ARIZONA.

FLYTRAP.

1,328,850.  Specification of Letters Patent.  Patented Jan. 27, 1920.

Application filed August 6, 1919. Serial No. 315,713.

*To all whom it may concern:*

Be it known that I, JOHN W. SKELTON, a citizen of the United States, residing at Douglas, in the county of Cochise and State of Arizona, have invented certain new and useful Improvements in Flytraps, of which the following is a specification.

This invention relates to insect traps and has special reference to traps for catching flies and similar insects. The object of the invention is to provide a device of simple and inexpensive construction which will attract the flies and permit their easy ingress but prevent their egress and also to provide simple means whereby the bait may be renewed from time to time.

The invention is illustrated in the accompanying drawings and will be hereinafter fully described, the novel features being subsequently pointed out in the appended claim.

In the drawings—

Figure 1:
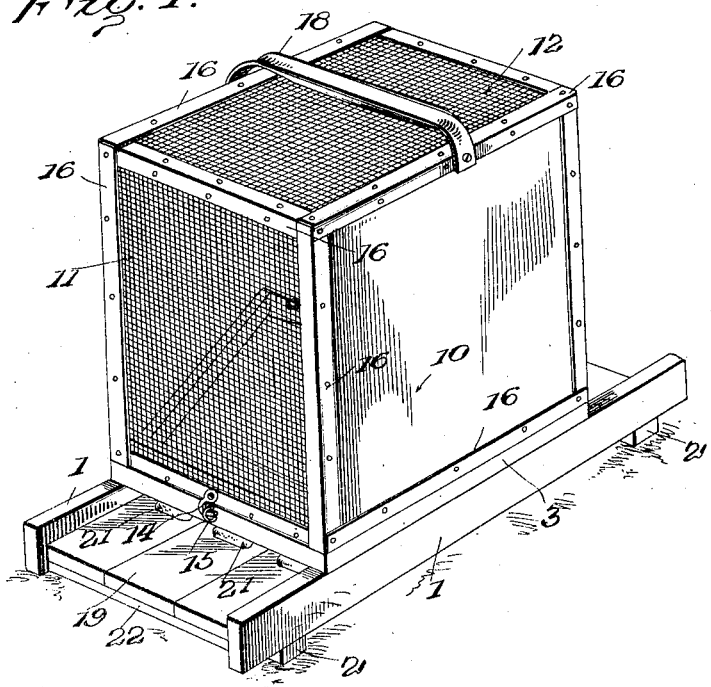
Figure 1 is a perspective view of a fly trap constructed in accordance with my invention.

In carrying out the invention, I employ a base consisting of longitudinal sills 1 connected near their ends and supported by cross bars 2. Upon the upper edges of the sills, I secure a cage comprising a floor 3 rigidly secured upon the sills and having openings 4 therethrough near its ends. Rising from the floor and secured thereto between the said openings is a tapered block 5 and from the center of said block rises a post 6. At the ends of the block are inclined rails 7 and secured upon the upper edges of said rails and extending between the same is a screen 8 preferably consisting of wire netting. The central portion of the ridge of the screen is supported by the post 6 so that it will be prevented from sagging and will be maintained in spaced relation to the block 5 throughout its area. Small openings 9 are provided at intervals along the ridge of this screen so that the flies may pass therethrough into the upper portion of the cage. Surrounding the tapered block 5 and the screen 8 is a cage member consisting of sides 10 and 11 and a top 12, one side 11 being connected with the adjacent end of the floor 3 by hinges 13 and the opposite side being held to the floor by a hook 14 engaging an eye 15 or by any other inexpensive fastening device. The sides 10 are illustrated as formed of imperforate material and the sides 11 and the top 12 are illustrated as formed of netting reinforced at the corners or edges by metallic facing strips 16 and supported by cross bars or beams 17. It will be understood, however, that all the sides may be of netting if so desired. The lower sills 17 and the lower edges of the imperforate sides rest directly upon the floor 3 at the edges thereof so that the insects cannot escape at that point. To permit the trap to be readily moved from place to place, a handle 18 of any preferred form is secured to the sides 10 and extends over the top 12 in spaced relation thereto.

Figure 2:
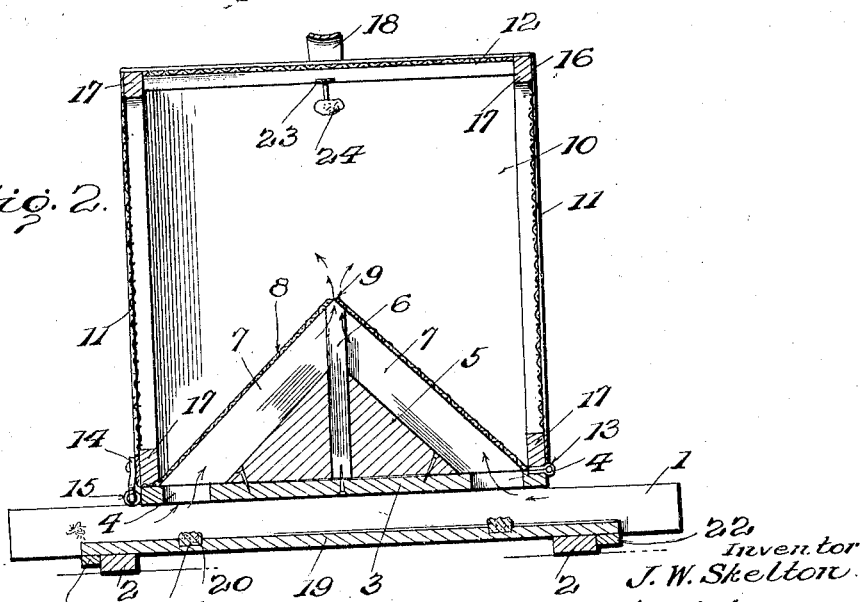
Fig. 2 is a longitudinal section of the same.

It will be readily noted that the sills 1 support the floor 3 in spaced relation to the cross bars or other fixed support 2 so that the insects may pass under the trap and then enter the same through the openings 4 and, to attract the flies, I support upon the cross bars 2 between the sills 1 a bait board 19 having recesses 20 in its upper face near its ends to receive bait, indicated at 21. The bait board will, of course, be appreciably lower than the sills so that there will be ample room for the passage of the insects over the bait board and below the bottom of the trap, while to prevent displacement of the board, cleats 22 are secured to the under side thereof at the ends of the same to engage against the cross bars 2, as clearly shown in Fig. 2. If so desired, a bait bar 23 may be secured in the top of the trap and bait suspended therefrom, as indicated at 24.

The operation of the trap will, it is thought, be readily understood. The several parts are arranged as shown in the drawings and as above described and the trap is then placed at the point infested by the flies. The bait will preferably be of some material having an odor attractive to the flies so that they will be drawn to and around the trap, and they will then pass into the space between the bait board and the floor of the trap to reach the bait. It is a well-known habit of flies to travel up toward the light and by reason of this habit they will pass through the openings 4 and seek an outlet through the screen 8 which will be found at the apex of the same. These openings will be just large enough to permit the flies to pass through and as their edges will be somewhat rough the flies will not escape by returning through the said openings.

Moreover, as the surface of the main portion of the trap is nearly all of reticulated material the great flood of light therethrough will tend to hold the flies in the cage. When the cage has been filled, an insecticide may be sprayed through the reticulated walls of the same so as to destroy the flies and the bodies may be discharged by releasing the hook or latch 14 and then swinging the cage about the hinges 13 so that the dead flies will fall from over the inclined screen 8. The flies may be destroyed by merely immersing the cage in a volume of water or any other disposition may be made of them which is convenient to the user of the trap.

The trap is exceedingly simple in the construction and arrangement of its parts and may be produced at a very low cost. The bait board may be readily removed to renew the bait by simply lifting the board until the cleats 22 clear the bars 2 whereupon the board may be slid endwise from between the sills 1. A reverse operation will return the board to its place below the trap.

Having thus described the invention, what is claimed as new is:

An insect trap comprising sills, a bait board disposed between the sills, a cage supported by and on the sills and provided with openings through its bottom adjacent its sides, a tapered block secured on the bottom of the cage and within the cage between the openings through the bottom, a post rising from said block, a tapered screen secured at its lower edges to the bottom of the cage and at the outer sides of the openings through the bottom and having its central portion supported by the said post, there being exit openings formed through said screen in the ridge thereof within the cage, and means for permitting the cage to be removed from over said screen.

In testimony whereof I affix my signature.

JOHN W. SKELTON. [L. S.]